United States Patent Office 3,185,714
Patented May 25, 1965

---

3,185,714
5,10-METHYLENE-19-NOR-PREGNANES, PREGNENES AND PREGNADIENES
Lawrence H. Knox, Mexico City, Mexico, assignor to Syntex Corporation, Panama, Panama, a corporation of Panama
No Drawing. Filed June 11, 1963, Ser. No. 286,912
Claims priority, application Mexico, Dec. 21, 1962, 70,273
24 Claims. (Cl. 260—397.3)

This invention relates to novel cyclopentanoperhydrophenanthrene derivatives.

More particularly, this invention relates to novel 5,10-methylene-19-nor derivatives of the pregnane series represented by the general formula:

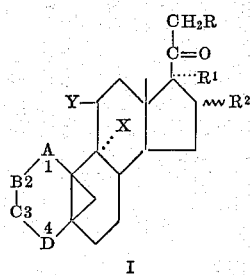

wherein R and $R^1$ each represent hydrogen, hydroxyl or an acyloxy radical containing less than 12 carbon atoms, $R^2$ represents hydrogen, α-methyl, β-methyl or α-hydroxyl; $R^1$ and $R^2$ taken together can also represent the grouping:

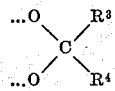

wherein $R^3$ represents hydrogen or a lower alkyl radical, e.g., methyl, ethyl, propyl and the like, and $R^4$ represents hydrogen or a lower alkyl, aryl, e.g. phenyl aralkyl e.g., tolyl, or alkaryl, e.g., benzyl radical; X represents hydrogen, fluorine or chlorine and Y represents hydrogen, β-hydroxyl or keto, with X being hydrogen when Y is hydrogen and both X and Y being hydrogen when R is hydrogen, are the grouping:

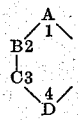

in ring A represents:

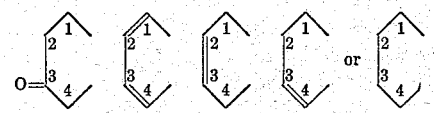

the carbon and hydrogen atoms present in the 1-, 2-, 3-, 4- positions in these groupings being omitted for the sake of clarity.

The novel 5,10-methylene-19-nor-pregnanes, -pregnenes and -pregnadienes represented by Formula I above can also be represented by the following more specific formulas:

II

III

IV

V

VI

VII

VII

IX

X

XI

In these formulas, $R^1$, $R^2$, X and Y have the same meanings as set forth hereinabove for Formula I, and $R^5$ represents hydrogen or an acyl radical containing less than 12 carbon atoms.

The acyloxy and acyl groups referred to above are derived from hydrocarbon carboxylic acids of less than 12 carbon atoms. These acids may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by Formulas II–VI, inclusive, are progestational agents with anti-estrogenic activity, useful in the maintenance of pregnancy and in fertility control. In addition, they relieve premenstrual tension.

The compounds represented by Formulas VII–XI, inclusive are corticoid hormones with anti-inflammatory activity, useful in the treatment of rheumatism, arthritis, dermatitis and eye and ear inflammation.

The compounds having progestational activity are obtained by the method illustrated by the following sequence of reactions:

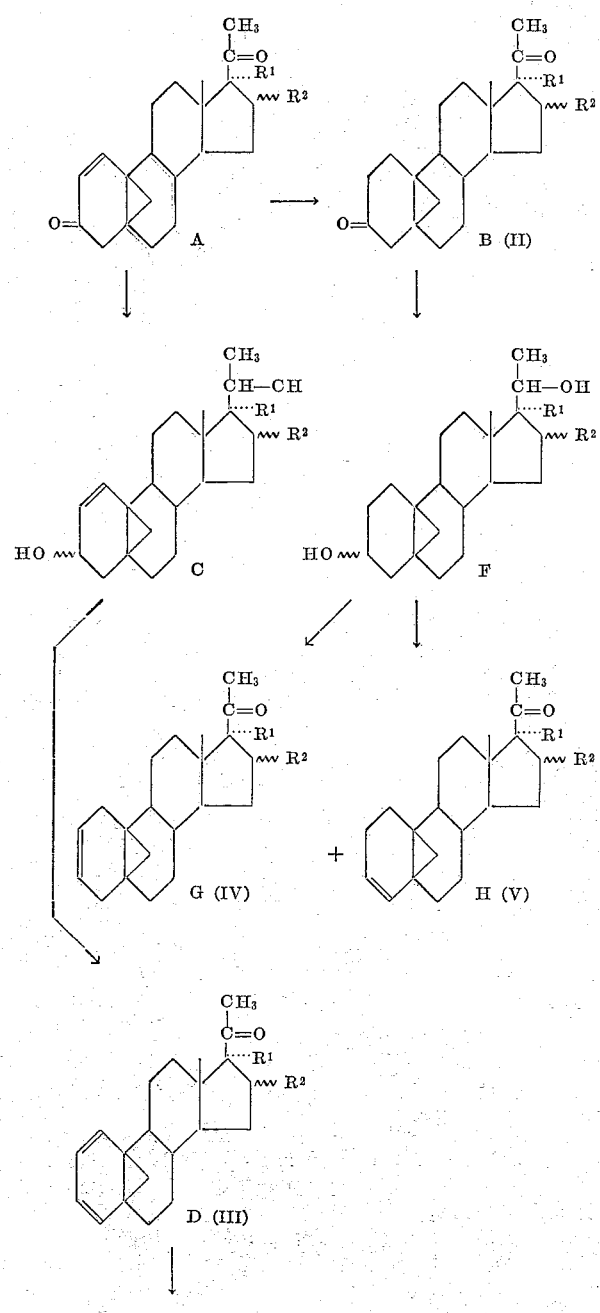

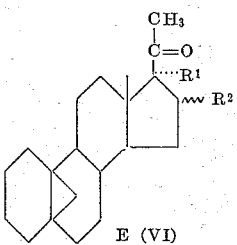

In the preceding formulas, $R^1$ and $R^2$ have the meanings hereinbefore indicated.

In practicing the process illustrated above, the starting materials, i.e., 5,10-methylene - 19 - nor-$\Delta^1$-pregnene-3,20-dione, 5,10 - methylene - 19 - nor-$\Delta^1$-pregnene-17α-ol-3,20-dione, or the corresponding 16-substituted derivatives (A), obtained by treatment of the corresponding 19-hydroxy-$\Delta^4$-3-keto steroids with 2-chloro-1,1,2-trifluorotriethylamine or 1,1,2,2-tetrafluoroethyldimethylamine, in an inert organic solvent, as described in my copending patent application Serial No. 286,931, filed June 11, 1963, are hydrogenated in ethanol solution and in the presence of a palladium catalyst, preferably using 5% palladium charcoal catalyst, to produce 5,10-methylene-19-nor-pregnane-3,20-dione, 5,10-methylene - 19 - nor-pregnan-17α-ol-3,20-dione and the 16-substituted derivatives thereof (B).

Reduction of the compounds represented by (A) with a double metal hydride, preferably with lithium aluminum hydride in tetrahydrofuran solution, produces the corresponding 3,20 - dihydroxy-5,10-methylene-19-nor-$\Delta^1$-pregnenes (mixture of α- and β-isomers) (C), which are easily dehydrated by heating with aqueous acetic acid, preferably using 50% acetic acid, at steam bath temperature for a period of time of the order of 1 to 4 hours, thus yielding the corresponding $\Delta^{1,3}$-3-desoxy-20-hydroxy-pregnadienes. Upon oxidation of these 20-hydroxy-pregnadienes with 8 N chromic acid in acetone or with chromic acid in aqueous acetic acid, there are obtained the corresponding $\Delta^{1,3}$-3-desoxy-20-keto-pregnadienes (D), i.e., 5,10-methylene-19-nor-$\Delta^{1,3}$-pregnadiene - 20 - one, 5,10 - methylene-16α-methyl-19-nor-$\Delta^{1,3}$-pregnadiene-20-one, 5,10 - methylene-16β-methyl-19-nor - $\Delta^{1,3}$ - pregnadiene-20-one, 5,10-methylene-17α-hydroxy-19-nor-$\Delta^{1,3}$-pregnadien - 20 - one and 5,10-methylene - 16α,17 - isopropylidenedioxy-19-nor-$\Delta^{1,3}$-pregnadien-20-one. Hydrogenation of these 20-keto-pregnadienes in ethanol solution and in the presence of a palladium-charcoal catalyst until absorption of 2 equivalents of hydrogen has taken place affords the corresponding saturated compounds (E).

In a similar manner, by reduction of 5,10-methylene-19-nor-pregnane-3,20-dione, 5,10 - methylene-19-nor-pregnan-17α-ol-3,20-dione or the corresponding 16-substituted derivatives (A) with a double metal hydride, there are obtained the respective 3,20-diols (F) which, by dehydration with aqueous acetic acid, followed by oxidation of the hydroxyl group at C-20 with chromic acid, produce a mixture of $\Delta^2$- and $\Delta^3$-3-desoxy compounds (G and H) which are separated by chromatography.

Alternatively, the dehydration of (C) and (F) may be effected by reaction with thionyl chloride in pyridine, or with 2-chloro-1,1,2-trifluorotriethylamine in methylene chloride, acetonitrile, or tetrahydrofuran solution, at low temperature, preferably between 0° C. and 20° C., for a period of time between 16 and 24 hours.

The 5,10-methylene-19-nor corticoids of the present invention are obtained by the method illustrated by the following reaction sequence:
In the preceding formulas, $Y^1$ represent hydrogen or a hydroxyl group; $R^6$ represents hydrogen, α-methyl or β-
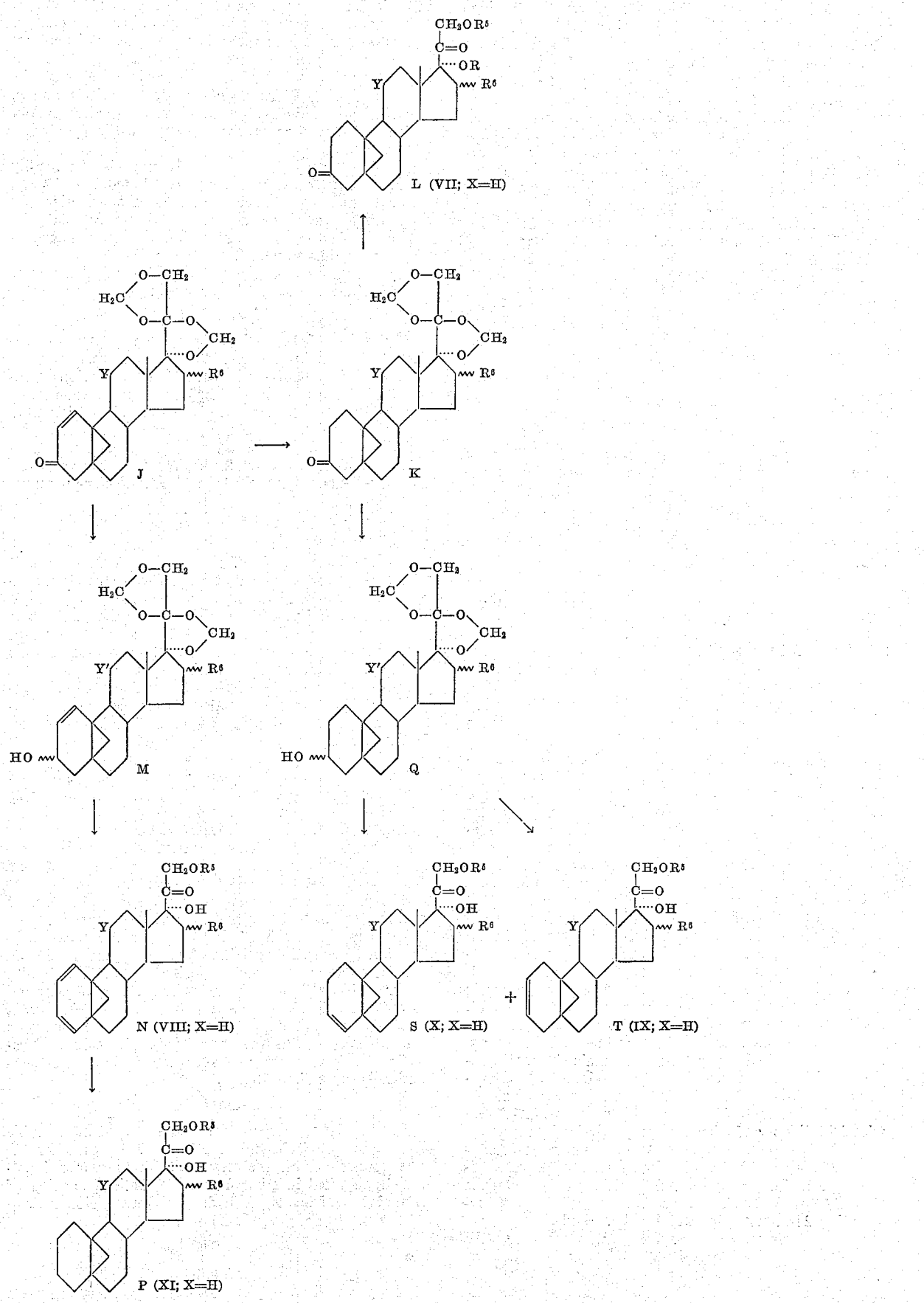

methyl; Y and $R^5$ having the meaning hereinbefore indicated.

In practicing the process illustrated above, the starting materials, 17,20;20,21-bismethylenedioxy-5,10-methylene-19-nor-$\Delta^1$-pregnene-3-one, 17,20;20,21-bismethylenedioxy-5,10-methylene-19-nor-$\Delta^1$-pregnene-3,11-dione, 17,20;20,21-bismethylenedioxy-5,10-methylene-19-nor-$\Delta^1$-pregnen-11$\beta$-ol-3-one and the corresponding 16-methyl derivatives (J), obtained as described in the aforementioned copending application Serial No. 286,931, are hydrogenated in ethanol solution and in the presence of 5% palladium-charcoal catalyst, to produce the saturated compounds (K). Hydrolysis of the bismethylenedioxy group by known methods, preferably by heating with 60% formic acid, affords 5,10-methylene-19-nor-pregnane-17$\alpha$,21-diol-3,20-dione, 5,10-methylene-19-nor-pregnane-17$\alpha$,21-diol-3,11,20-trione, 5,10-methylene-19-nor-pregnane-11$\beta$,17$\alpha$,21-triol-3,20-dione and the corresponding 16-methyl derivatives (L; $R^5$=H).

Alternatively, said hydrogenation may be carried out using as starting materials the 21-esters of 5,10-methylene-19-nor-$\Delta^1$-pregnene-17$\alpha$,21-diol-3,20-dione, which may be further substituted at C–11 by a hydroxyl or a keto group and at C–16 by a methyl group, to produce the corresponding 21-esters of 5,10-methylene-19-nor-pregnane-17$\alpha$,21-diol as well as the 11 and/or 16-substituted compounds (L; $R^5$=acyl).

By reduction of the compounds represented by (J) with lithium aluminum hydride in tetrahydrofuran solution, there are obtained the corresponding 3-hydroxy or 3,11-dihydroxy derivatives (M), the 11-keto group, if present, being reduced during this reaction, which are dehydrated, preferably with 50% acetic acid, as indicated hereinbefore, to produce the corresponding 5,10-methylene-17,20;20,21-bismethylenedioxy-$\Delta^{1,3}$-pregnadienes. The bismethylenedioxy group in these $\Delta^{1,3}$-pregnadienes is then hydrolized, e.g., by heating with 60% formic acid, to give 5,10-methylene-19-nor-$\Delta^{1,3}$-pregnadiene-17$\alpha$,21-diol-3,20-dione, 5,10-methylene-19-nor-$\Delta^{1,3}$-pregnadiene-11$\beta$,17$\alpha$,21-triol-3,20-dione and the 16-methyl derivatives thereof (N; $R^5$=H), which are converted into the 21-monoesters by conventional methods, preferably by reaction with acid anhydride or acid chloride containing less than 12 carbon atoms in pyridine solution.

By hydrogenation of (N) ($R^2$=acyl) in ethanol solution using a palladium-charcoal catalyst until absorption of 2 equivalents of hydrogen has taken place, there are obtained the 3-desoxy-5,10-methylene-19-nor-pregnanes (P; $R^5$=acyl) which may be converted into the corresponding 21-hydroxy compounds by conventional saponification, such as treatment at low temperature with a dilute solution of potassium hydroxide in methanol.

In a similar manner, by reduction of the saturated compounds (K) with lithium aluminum hydride or sodium borohydride, there are obtained mixtures of the 3$\alpha$ and 3$\beta$-hydroxy compounds (Q). In the case of the 11-keto derivatives the keto group at C–11 is also reduced. By dehydration of these compounds with aqueous acetic acid, as previously described, there are obtained the 17,20;20,21-bismethylenedioxy-5,10-methylene-$\Delta^2$- and $\Delta^3$-19-nor-pregnenes, which are separated by chromatography. The dihydroxyacetone side chain is finally regenerated by treatment wtih 60% formic acid, thus producing 5,10-methylene-19-nor-$\Delta^3$-pregnene-17$\alpha$,21-diol-3,20-dione, 5,10-methylene-19-nor-$\Delta^3$-pregnene-11$\beta$,17$\alpha$-21-triol-3,20-dione and the 16-methyl derivatives thereof (S; $R^5$=H), 5,10-methylene-19-nor-$\Delta^2$-pregnene-17$\alpha$,21-diol-3,20-dione and 5,10-methylene-19-nor-$\Delta^2$-pregnene-11$\beta$,17$\alpha$,21-triol-3,20-dione and the 16-methyl derivatives thereof (T; $R^5$=H), which are converted into the corresponding 21-esters by conventional methods.

The 11-hydroxylated compounds may be converted into the corresponding 11-keto derivatives by oxidation with chromic acid in acetic acid or 8 N-chromic acid in acetone following protection of the dihydroxyacetone side chain. Furthermore, a halogen atom at C–9$\alpha$ may be introduced by known methods, for example by following Fried's method [J. Am. Chem. Soc. 75, 2273 (1953)].

Several additional reactions may be also effected in order to obtain the compounds of the present invention. Thus for example, a hydroxyl group may be introduced at C–11 and/or C–16 by known microbiological methods, preferably using *Rhizopus nigricans*, *Curvularia lunata*, *Cunninghamella bainieri*, etc., for the 11-hydroxylation, and *Streptomyces roseochromogenus* for the hydroxylation at C–16.

The 21-hydroxylated compounds may also be readily obtained from the compounds unsubstituted at C–21 (B, D, E, G and H), by carrying out the method described by H. J. Ringold et al. in Journal Am. Chem. Soc. 80, 250 (1958), followed by saponification of the 21-acetoxy compounds thus obtained.

The following examples serve to illustrate the present invention but do not restrict its scope:

*Example I*

A solution of 1 g. of 5,10-methylene-19-nor-$\Delta^1$-pregnene-3,20-dione in 150 cc. of 96% ethanol was added to 1 g. of 5% palladium-charcoal catalyst previously reduced, and the mixture was hydrogenated at room temperature and atmospheric pressure until absorption of 1 molar equivalent of hydrogen (approximately in 30 minutes). The catalyst was filtered and the filtrate evaporated to dryness. Crystallization of the residue from acetone-hexane have 5,10-methylene-19-nor-pregnane-3,20-dione.

*Example II*

A solution of 3g. of 5,10-methylene-19-nor-$\Delta^1$-pregnene-3,20-dione in 150 cc. of anhydrous tetrahydrofuran was added over a 15 minute period to a stirred suspension of 3 g. of lithium aluminum hydride in 150 cc. of anhydrous tetrahydrofuran. The mixture was refluxed for 1 hour, cooled and carefully treated with 10 cc. of ethyl acetate and 5 cc. of water. Solid sodium sulfate was added, the inorganic material filtered off and washed several times with hot ethyl acetate. The combined organic solutions were evaporated, to produce a crude material which was purified by crystallization from acetone-hexane, thus giving 5,10-methylene-19-nor-$\Delta^1$-pregnene-3,20-diol.

1 g. of the foregoing compound was dissolved in 25 cc. of 50% acetic acid and the resulting solution was heated on the steam bath for 4 hours. After this period of time it was diluted with water, the formed precipitate was collected by filtration, washed to neutral and recrystalized from acetone-ether. There was thus obtained 5,10-methylene-19-nor-$\Delta^{1,3}$-pregnadien-20-ol.

The preceding compound was dissolved in 10 cc. of acetone, cooled to 0° C. and then treated under nitrogen atmosphere and with stirring, with 8 N chromic acid solution (prepared by mixing 26 g. of chromium trioxide with 23 cc. of concentrated sulfuric acid and dilution with water to 100 cc.) until the color of the reagent persisted in the mixture. It was stirred for 5 minutes further at 0–5° C. and diluted with water. The precipitate was filtered, washed with water and dried under vacuo. Crystallization from acetone-hexane gave 5,10-methylene-19-nod-$\Delta^{1,3}$-pregnadiene-20-one.

*Example III*

In accordance with the method described in Example I. 500 mg. of 5,10-methylene-19-nor-$\Delta^{1,3}$-pregnadien-20-one were reduced in the presence of 500 mg. of 5% palladium-charcoal in ethanol solution, until absorption of 2 molar equivalents of hydrogen, thus yielding 5,10-methylene-19-nor-pregnan-20-one.

*Example IV*

In accordance with the method described in Example II, 1.5 g. of 5,10-methylene-19-nor-pregnane-20-one were reduced with lithium aluminum hydride in tetrahydrofuran solution to produce 5,10-methylene-19-nor-pregnane-3β,20β-diol in mixture with its 3α-isomer.

A solution of 500 mg. of the foregoing compound in 15 cc. of glacial acetic acid was heated on the steam bath for 1 hour. It was then evaporated to dryness under reduced pressure and the residue oxidized with 8 N-chromic acid in acetone, in accordance with the method described in Example II. The total oxidation product was chromatographed on 25 g. of washed alumina thus producing 5,10-methylene-19-nor-$\Delta^2$-pregnane-20-one and 5,10-methylene-19-nor-$\Delta^3$-pregnen-20-one.

*Example V*

By following the hydrogenation method of Example I, the compounds below mentioned under I were converted into the saturated derivatives II.

| I | II |
|---|---|
| 5,10-methylene-16α-methyl-19-nor-$\Delta^1$-pregnene-3,20-dione. | 5,10-methylene-16α-methyl-19-nor-pregnane-3,20-dione. |
| 5,10-methylene-16β-methyl-19-nor-$\Delta^1$-pregnene-3,20-dione. | 5,10-methylene-16β-methyl-19-nor-pregnane-3,20-dione. |
| 5,10-methylene-16α,17α-isopropylidenedioxy-19-nor-$\Delta^1$-pregnene-3,20-dione. | 5,10-methylene-16α,17α-isopropylidenedioxy-19-nor-pregnane-3,20-dione. |
| 5,10-methylene-19-nor-$\Delta^1$-pregnene-17α-ol-3,20-dione acetate. | 5,10-methylene-19-nor-pregnane-17α-ol-3,20-dione acetate. |
| 5,10-methylene-16α-methyl-19-nor-$\Delta^1$-pregnene-17α-ol-3,20-dione acetate. | 5,10-methylene-16α-methyl-19-nor-pregnane-17α-ol-3,20-dione acetate. |
| 17,20;20,21-bismethylenedioxy-5,10-methylene-19-nor-$\Delta^1$-pregnene-3,11-dione. | 17,20;20,21-bismethylenedioxy-5,10-methylene-19-nor-pregnane-3,11-dione. |
| 17,20;20,21-bismethylenedioxy-5,10-methylene-19-nor-$\Delta^1$-pregnene-3-one. | 17,20;20,21-bismethylenedioxy-5,10-methylene-19-nor-pregnane-3-one. |
| 5,10-methylene-19-nor-$\Delta^1$-pregnene-11β,17α,21-triol-3,20-dione 21-acetate. | 5,10-methylene-19-nor-pregnane-11β,17α,21-triol-3,20-dione 21-acetate. |
| 5,10-methylene-19-nor-$\Delta^1$-pregnene-17α,21-diol-3,11,20-trione 21-acetate. | 5,10-methylene-19-nor-pregnane-17α,21-diol-3,11,20-trione 21-acetate. |
| 5,10-methylene-16α-methyl-19-nor-$\Delta^1$-pregnene-17α,21-diol-3,20-dione 21-acetate. | 5,10-methylene-16α-methyl-19-nor-pregnane-17α,21-diol-3,20-dione 21-acetate. |

*Example VI*

Example II was repeated but using as starting material 5,10-methylene-16α-methyl-19-nor-$\Delta^1$-pregnene-3,20-dione to produce successively: 5,10-methylene-16α-methyl-19-nor-$\Delta^1$-pregnene-3,20-diol, 5,10-methylene-16α-methyl-19-nor-$\Delta^{1,3}$-pregnadien-20-ol and 5,10-methylene-16α-methyl-19-nor-$\Delta^{1,3}$-pregnadien-20-one.

In a similar manner, starting from 5,10-methylene-16β-methyl-19-nor-$\Delta^1$-pregnene-3,20-dione, there were obtained the corresponding 16β-methyl compounds.

*Example VII*

In accordance with the method described in Example IV, 2 g. of 5,10-methylene-16α,17α-isopropylidenedioxy-19-nor-pregnane-3,20-dione gave as final products 5,10-methylene-16α,17α-isopropylidenedioxy-19-nor-$\Delta^2$-pregnen-20-one and 5,10-methylene-16α,17α-isopropylidenedioxy-19-nor-$\Delta^3$-pregnen-20-one.

By the same method, 5,10-methylene-16α-methyl-19-nor-pregnan-3,20-dione afforded 5,10-methylene-16α-methyl-19-nor-$\Delta^2$-pregnen-20-one and 5,10-methylene-16α-methyl-19-nor-$\Delta^3$-pregnen-20-one.

*Example VIII*

In accordance with the method described in Example II, 5,10-methylene-19-nor-$\Delta^1$-pregnen-17α-ol-3,20-dione acetate was reduced with lithium aluminum hydride to produce 5,10-methylene-19-nor-$\Delta^1$-pregnen-3,17,20-triol, which was dehydrated with 50% acetic acid and then oxidized with 8 N chromic acid thus yielding 5,10-methylene-19-nor-$\Delta^{1,3}$-pregnadien-17α-ol-20-one.

To a solution of 500 mg. of the foregoing compound in 10 cc. of anhydrous benzene, there were added 100 mg. of p-toluenesulfonic acid and 2 cc. of propionic anhydride and the mixture was allowed to stand at room temperature for 24 hours, poured into ice water and the resulting mixture stirred to effect hydrolysis of the excess anhydride. The benzene layer was separated and washed with 10% sodium carbonate solution and water. Drying, evaporation and crystallization of the residue from ether-hexane gave the propionate of 5,10-methylene-19-nor-$\Delta^{1,3}$-pregnadien-17α-ol-20-one.

In the same manner, starting from 5,10-methylene-16α-methyl-19-nor-$\Delta^1$-pregnen-17α-ol-3,20-dione acetate there was obtained 5,10-methylene-16α-methyl-19-nor-$\Delta^{1,3}$-pregnadien-17α-ol-20-one and its propionate.

*Example IX*

Example IV was repeated but using as starting material the acetate of 5,10-methylene-16α-methyl-19-norpregnan-17α-ol-3,20-dione, to produce as final products 5,10-methylene-16α-methyl-19-nor-$\Delta^2$-pregnen-17α-ol-20-one and 5,10-methylene-16α-methyl-19-nor-$\Delta^3$-pregnen-17α-ol-20-one. Starting from 5,10-methylene-16α,17α-isopropylidenedioxy-19-nor-pregnan-3,20-dione there were obtained 5,10-methylene-16α,17α-isopropylidenedioxy-19-nor-$\Delta^2$-pregnen-20-one and the $\Delta^3$-isomer.

*Example X*

In accordance with the method described in Example II, 1 g. of 17,20;20,21-bismethylenedioxy-5,10-methylene-19-nor-$\Delta^1$-pregnen-3-one was reduced with lithium aluminum hydride. The 3-hydroxy intermediate was dissolved in 50 cc. of anhydrous tetrahydrofuran and treated with 1.5 equivalents of 2-chloro-1,1,2-trifluorotriethylamine, and the mixture was allowed to stand at 0° C. for 20 hours. It was then evaporated to dryness, thus producing 17,20;20,21-bismethylenedioxy-5,10-methylene-19-nor-$\Delta^{1,3}$-pregnadiene.

A mixture of 700 mg. of the preceding compound and 20 cc. of 60% formic acid was heated on the steam bath for 1 hour, cooled, diluted with water and the formed precipitate collected by filtration washed with water, dried and recrystallized from acetone-hexane, thus producing 5,10-methylene-19-nor-$\Delta^{1,3}$-pregnadiene-17α,21-diol-20-one.

A mixture of 250 mg. of the foregoing compound, 2 cc. of pyridine and 2 cc. of acetic anhydride was kept at room temperature overnight, poured into water and the formed precipitate collected by filtration. Crystallization from acetone-hexane gave the 21-acetate of 5,10-methylene-19-nor-$\Delta^{1,3}$-pregnadiene-17α,21-diol-20-one.

*Example XI*

To a solution of 1 g. of 17,20;20,21-bismethylenedioxy-5,10-methylene-19-nor-pregnane-3-one in 50 cc. of tetrahydrofuran there was added 1 g. of sodium borohydride and the mixture kept for 16 hours at room temperature. The excess reagent was decomposed by addition of acetic acid, the solution was concentrated to a small volume under vacuo and diluted with water. The product was extracted with ethyl-acetate, the extract was washed with water, dried and evaporated to dryness. The total product of this reduction was dehydrated with 2-chloro-1,1,2-trifluorotriethylamine in accordance with the method described in the preceding example. After hydrolysis of the bismethylenedioxy group with 60% formic acid there were obtained 5,10-methylene-19-nor-$\Delta^2$-pregnene-17α,21-diol-20-one and 5,10-methylene-19-nor-$\Delta^3$-pregnene-17α,21-diol-20-one which were separated by chromatography on silica gel.

*Example XII*

By following the procedure described in Example X, 1 g. of 17,20;20,21-bismethylenedioxy-5,10-methylene-19-nor-pregnane-3,11-dione were hydrolyzed with 60% formic acid, to produce 5,10-methylene-19-nor-pregnane-17α,21-diol-3,11,20-trione.

In a similar manner, but using 17,20;20,21-bismethylenedioxy-19-nor-pregnan-3-one, there was obtained 5,10-methylene-19-nor-pregnane-17α,21-diol-3,20-dione.

Example XIII

To a solution of 5 g. of the acetate of 5,10-methylene-16α-methyl-19-nor-pregnan-17α-ol-3,20-dione in 500 cc. of methanol there was added 100 mg. of potassium hydroxide dissolved in 1 cc. of water and the mixture was refluxed for 1 hour, poured into water and the formed precipitate filtered, thus obtaining 5,10-methylene-16α-methyl-19-nor-pregnan-17α-ol-3,20-dione.

A cooled solution of 4 g. of the foregoing compound in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-5,10-methylene-16α-methyl-19-nor-pregnan-17α-ol-3,20-dione.

This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding the 21-acetate of 5,10-methylene-16α-methyl-19-nor-pregnane-17α,21-diol-3,20-dione.

A solution of 1 g. of the preceding compound in 50 cc. of methanol was treated with 3 cc. of a 5% potassium hydroxide solution under nitrogen atmosphere and the mixture was allowed to stand at 0° C. for 1 hour. It was then diluted with water and the formed precipitate collected by filtration to give 5,10-methylene-16α-methyl-19-nor-pregnane-17α,21-diol-3,20-dione.

In the same manner starting from the acetate of 5,10-methylene-19-nor-pregnan-17α-ol-3,20-dione there were obtained the 21-acetate of 5,10-methylene-19-nor-pregnane-17α,21-diol-3,20-dione and the free compound.

Example XIV

The compounds below mentioned I were converted into the corresponding 21-acetoxy derivatives and then saponified by following the method described in the preceding example, to give the compounds listed under II.

| I | II |
| --- | --- |
| 5,10-methylene-16α-methyl-19-nor-Δ$^{1,3}$-pregnadien-17α-ol-20-one. | 5,10-methylene-16α-methyl-19-nor-Δ$^{1,3}$-pregnadiene-17α,21-diol-20-one. |
| 5,10-methylen-16α-methyl-19-nor-pregnan-17α-ol-3,20-dione. | 5,10-methylene-16α-methyl-19-nor-pregnane-17α,21-diol-3,20-dione. |
| 5,10-methylene-16α,17α-isopropylidenedioxy-19-nor-Δ$^2$-pregnen-20-one. | 5,10-methylene-16α,17α-isopropylidenedioxy-19-nor-Δ$^2$-pregnen-21-ol-20-one. |

Example XV

A mixture of 1 g. of 5,10-methylene-19-nor-pregnane-17α,21-diol-3,20-dione, 4 cc. of pyridine and 4 cc. of propionic anhydride was kept at room temperature for 4 hours, it was then cooled into ice water, the formed precipitate filtered off, washed with water and dried. By crystallization from acetone-hexane there was obtained the 21-propionate of 5,10-methylene-19-nor-pregnane-17α,21-diol-3,20-dione.

By the same method, the compounds below mentioned I were converted into the 21-esters II, according to the anhydride used.

| I | Anhydride | II |
| --- | --- | --- |
| 5,10-methylene-16α-methyl-19-nor-Δ$^{1,3}$-pregnadiene-17α,21-diol-20-one. | Propionic | 21-propionate of 5,10-methylene-16α-methyl-19-nor-Δ$^{1,3}$-pregnadiene-17α,21-diol-20-one. |
| 5,10-methylene-16α-methyl-19-nor-pregnane-17α,21-diol-3,20-dione. | Caproic | 21-caproate of 5,10-methylene-16α-methyl-19-nor-pregnane-17α,21-diol-3,20-dione. |
| 5,10-methylene-16α,17α-isopropylidenedioxy-19-nor-Δ$^2$-pregnen-21-ol-20-one. | Cyclopentylpropionic. | Cyclopentylpropionate of 5,10-methylene-16α,17α-isopropylidenedioxy-19-nor-Δ$^2$-pregnen-21-ol-20-one. |

Example XVI

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

| | G. |
| --- | --- |
| Glucose | 20 |
| $(NH_4)_2HPO_4$ or | 5 |
| $NaNO_3$ | 3 |
| $K_2HPO_4$ | 1 |
| $MgSO_4 \cdot 7H_2O$ | 0.2 |
| KCl | 0.5 |
| $ZnSO_4$ | Traces |
| $FeSO_4 \cdot 7H_2O$ | Traces |

Distilled water to complete 1 lt.

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of 5,10-methylene-19-nor-pregnane-17α,21-diol 3,20-dione in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was adsorbed on 4 g. of silica gel and eluted with methylene chloride (9:1) to produce 5,10-methylene-19-nor-pregnane-11β,17α,21-triol-3,20-dione.

By the same method, starting from the C-11 unsubstituted compounds, there were obtained: 5,10-methylene-16α-methyl-19-nor-pregnane-11β,17α,21-triol-3,20-dione, 5,10-methylene-16α,17α-isopropylidenedioxy-19-nor-pregnane-11β,21-diol-3,20-dione, and 5,10-methylene-16α-methyl-19-nor-Δ$^{1,3}$-pregnadiene-11β,17α,21-triol-20-one.

Esterification of these compounds with acetic anhydride in pyridine solution, by following the method of Example XV, afforded the corresponding 21-acetates.

Example XVII

A solution of 1.1 equivalents of chromic acid in 5 cc. of 80% acetic acid was added dropwise to a stirred solution of 1 g. of the 21-acetate of 5,10-methylene-16α-methyl-19-nor-pregnane-11β,17α,21-triol-3,20-dione in 40 cc. of glacial acetic acid, maintaining the temperature around 20° C. The mixture was kept for 2 hours at room temperature, poured into water and the formed precipitate collected by filtration, washed to neutrality and air dried. There was thus produced the 21-acetate of 5,10- methylene - 16α - methyl - 19 - nor - pregnane-17α,21-diol-3-11,20-trione.

In a similar manner, the 21-acetate of 5,10-methylene-16α,17α - isopropylidenedioxy - 19 - nor-pregnane-11β,21-diol-3,20-dione and the 21-acetate of 5,10-methylene-16α-methyl - 19 - nor - Δ$^{1,3}$ - pregnadiene 11β,17α,21 - triol-20-one gave the 21-acetate of 5,10-methylene-16α,17α-isopropylidenedioxy - 19-nor-pregnan-21-ol-3,11,20-trione and the 21-acetate of 5,10-methylene-16α-methyl-19-nor-Δ$^{1,3}$-pregnadiene-17α,21-diol-3,11,20-trione.

*Example XVIII*

A cold solution of 5 g. of the 21-acetate of 5,10-methylene - 19 - nor - pregnane - 11β,17α,21 - triol - 3,20-dione in 5 cc. of dimethyl formamide was treated with 2.8 g. of mesyl chloride and 2.5 cc. of pyridine and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished the 21-acetate of 5,10-methylene-19-nor-Δ$^{9(11)}$-pregnene-17α,21-diol-3,20-dione.

To a stirred solution of 2 g. of the latter compound in 20 cc. of pure dioxane there were added 0.4 cc. of 3 N perchloric acid and 1 g. of N-bromoacetamide during 30 minutes. The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding bromohydrin.

A mixture of 2 g. of anhydrous potassium acetate and 20 cc. of acetone was heated almost to boiling and then a solution of 1.7 g. of the bromohydrin in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained the 21-acetate of 5,10-methylene-9β,11β-oxido-19-nor-pregnane-17α,21-diol-3,20-dione.

In a polyethylene flask, adapted with a magnetic stirrer, there was dissolved 0.9 g. of the foregoing compound in 15 cc. of methylene chloride, the solution was cooled to 0° C. and a solution of 1.1 g. of anhydrous hydrogen fluoride in 3.7 cc. of tetrahydrofuran cooled in a Dry Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby the 21-acetate of 5,10 - methylene - 9α - fluoro - 19 - nor - pregnane-11β,17α,21-triol-20-dione crystallized.

By the same method the 21-acetate of 5,10-methylene-16α - methyl - 19 - nor - pregnane - 11β,17α,21-triol-3,20-dione, the 21-acetate of 5,10-methylene-16α,17α-isopropylidenedioxy - 19 - nor - pregnane - 11β,21-diol,3,20-dione and the 21-acetate of 5,10-methylene-16α-methyl-19-nor-Δ$^{1,3}$-pregnadiene - 11β,17α,21-triol-20-one were converted into the corresponding 9α-fluoro derivatives.

*Example XIX*

To a solution of 1 g. of the 21-acetate of 5,10-methylene - 16α - methyl - 9β,11β - oxido - 19 - nor - pregnane-17α,21-diol,3,20-dione, obtained in accordance with the preceding example, in 10 cc. of anhydrous chloroform, was added, over a period of 15 minutes, 8 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave the 21-acetate of 5,10-methylene-16α-methyl-9α-chloro-19-nor-pregnane-11β,17α,21-triol-3,20-dione.

The latter compound was oxidized with 8 N chromic acid in acetone, in accordance with the method described in Example II, to give the 21-acetate of 5,10-methylene-16α-methyl - 9α - chloro - 19 - nor-pregnane-17α,21-diol-3,11,20-trione.

*Example XX*

A mixture of 1 g. of 5,10-methylene-16α,17α-isopropylidenedioxy-19-nor-pregnane-3,20-dione and 20 cc. of 60% formic acid was heated on the steam bath for 1 hour, cooled, diluted with water and the precipitate was collected washed with water, dried and recrystallized from acetone-hexane, thus affording 5,10-methylene-19-nor-pregnane-16α,17α-diol-3,20-dione.

By the same procedure, the compounds listed below under I gave the products under II.

| I | II |
|---|---|
| 5,10-methylene-16α,17α-isopropylidenedioxy-19-nor-Δ$^2$-pregnen-20-one. | 5,10-methylene-19-nor-Δ$^2$-pregnene-16α,17α-diol-20-one. |
| 5,10-methylene-16α,17α-isopropylidenedioxy-19-nor-pregnane-11β, 21-diol-3,20-dione 21-acetate. | 5,10-methylene-19-nor-pregnane-11β,16α,17α,21-tetrol-3,20-dione 21-acetate. |
| 5,10-methylene-16α,17α-isopropylidenedioxy-9α-fluoro-19-nor-pregnane-11β,21-diol-3,20-dione 21-acetate. | 5,10-methylene-9α-fluoro-19-nor-pregnane-11β,16α,17α-21-tetrol-3, 20-dione 21-acetate. |
| 5,10-methylene-16α,17α-isopropylidenedioxy-19-nor-Δ$^2$-pregnen-21-ol-20-one acetate. | 5,10-methylene-19-nor-Δ$^2$-pregnene-16α,17α,21-triol-20-one 21-acetate. |

I claim:
1. A compound represented by the formula:

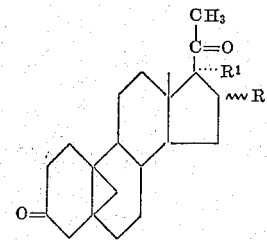

wherein $R^1$ is selected from the group consisting of hydrogen, hydroxyl and acyloxy containing less than 12 carbon atoms; $R^2$ is selected from the group consisting of hydrogen, α-methyl, β-methyl and α-hydroxyl and $R^1$ and $R^2$ taken together represent the grouping:

wherein $R^3$ is selected from the group consisting of hydrogen and lower alkyl and $R^4$ is selected from the group consisting of hydrogen and lower alkyl, monocyclic aryl, monocyclic aralkyl and monocyclic alkaryl.
2. 5,10-methylene-19-nor-pregnane-3,20-dione.
3. 5,10-methylene-19-nor-pregnan-17α-ol-3,20-dione.
4. 5,10 - methylene - 16α - methyl - 19-nor-pregnane-3,20-dione.

5. A compound represented by the formula:

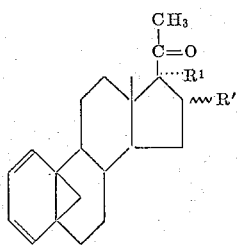

wherein $R^1$ is selected from the group consisting of hydrogen, hydroxyl and acyloxy containing less than 12 carbon atoms; $R^2$ is selected from the group consisting of hydrogen, α-methyl, β-methyl and α-hydroxyl and $R^1$ and $R^2$ taken together represent the grouping:

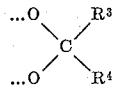

wherein $R^3$ is selected from the group consisting of hydrogen and lower alkyl and $R^4$ is selected from the group consisting of hydrogen and lower alkyl, monocyclic aryl, monocyclic aralkyl and monocyclic alkaryl.

6. 5,10-methylene-19-nor-$\Delta^{1,3}$-pregnadien-20-one.

7. A compound represented by the formula:

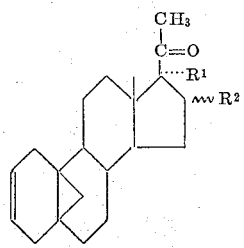

wherein $R^1$ is selected from the group consisting of hydrogen, hydroxyl and acyloxy containing less than 12 carbon atoms; $R^2$ is selected from the group consisting of hydrogen, α-methyl, β-methyl and α-hydroxyl and $R^1$ and $R^2$ taken together represent the grouping:

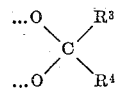

wherein $R^3$ is selected from the group consisting of hydrogen and lower alkyl and $R^4$ is selected from the group consisting of hydrogen and lower alkyl, monocyclic aryl, monocyclic aralkyl and monocyclic alkaryl.

8. 5,10-methylene-19-nor-$\Delta^2$-pregnen-20-one.

9. A compound represented by the formula:

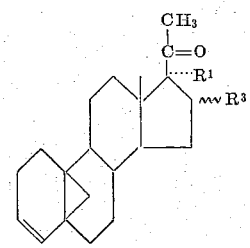

wherein $R^1$ is selected from the group consisting of hydrogen, hydroxyl and acyloxy containing less than 12 carbon atoms; $R^2$ is selected from the group consisting of hydrogen, α-methyl, β-methyl and α-hydroxyl and $R^1$ and $R^2$ taken together represent the grouping

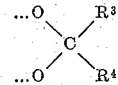

wherein $R^3$ is selected from the group consisting of hydrogen and lower alkyl and $R^4$ is selected from the group consisting of hydrogen and lower alkyl, monocyclic aryl, monocyclic aralkyl and monocyclic alkaryl.

10. 5,10-methylene-19-nor-$\Delta^3$-pregnen-20-one.

11. A compound represented by the formula:

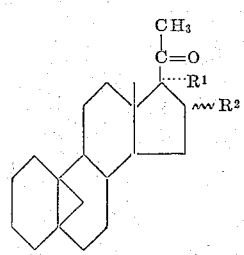

wherein $R^1$ is selected from the group consisting of hydrogen, hydroxy and acyloxy containing less than 12 carbon atoms; $R^2$ is selected from the group consisting of hydrogen, α-methyl, β-methyl and α-hydroxyl and $R^1$ and $R^2$ taken together represent the grouping:

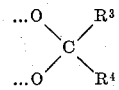

wherein $R^3$ is selected from the group consisting of hydrogen and lower alkyl and $R^4$ is selected from the group consisting of hydrogen and lower alkyl, monocyclic aryl, monocyclic aralkyl and monocyclic alkaryl.

12. 5,10-methylene-19-nor-pregnan-20-one.

13. A compound represented by the formula.

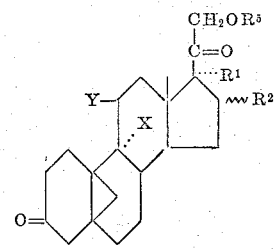

wherein $R^1$ is hydroxyl, $R^2$ is selected from the group consisting of hydrogen, α-methyl, β-methyl and α-hydroxyl; $R^1$ and $R^2$ taken together represent the grouping:

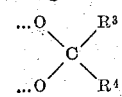

wherein $R^3$ is selected from the group consisting of hydrogen and lower alkyl and $R^4$ is selected from the group consisting of hydrogen and lower alkyl, monocyclic aryl, monocyclic aralkyl and monocyclic alkarlyl; $R^5$ is selected from the group consisting of hydrogen and acyl containing less than 12 carbon atoms; X is selected from the group consisting of hydrogen, fluorine and chlorine, and Y is selected from the group consisting of hydrogen, β-hydroxyl and keto, with X being hydrogen when Y is hydrogen.

14. 5,10 - methylene-19-nor-pregnane-17α,21-diol-3,20-dione.

15. 5,10 - methylene-19-nor-pregnane-11β,17α,21-triol-3,20-dione.

16. 5,10 - methylene-19-nor-pregnane-17α,21-diol-3,11,20-trione.

17. 5,10 - methylene-16α-methyl-19-nor-pregnane-11β,17α,21-triol-3,20-dione.

18. A compound represented by the formula:

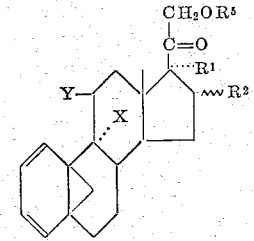

wherein R¹ is hydroxyl, R² is selected from the group consisting of hydrogen, α-methyl, β-methyl and α-hydroxyl; R¹ and R² taken together represent the grouping:

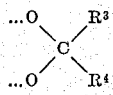

wherein R³ is selected from the group consisting of hydrogen and lower alkyl and R⁴ is selected from the group consisting of hydrogen and lower alkyl, monocyclic aryl, monocyclic aralkyl and monocyclic alkarlyl; R⁵ is selected from the group consisting of hydrogen and acyl containing less than 12 carbon atoms; X is selected from the group consisting of hydrogen, fluorine and chlorine, and Y is selected from the group consisting of hydrogen, β-hydroxyl and keto, with X being hydrogen when Y is hydrogen.

19. 5,10-methylene-19-nor - $\Delta^{1,3}$ - pregnadiene-11β,17α, 21-triol-20-one.

20. A compound represented by the formula:

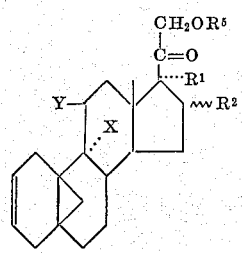

wherein R¹ is hydroxyl, R² is selected from the group consisting of hydrogen, α-methyl, β-methyl and α-hydroxyl; R¹ and R² taken together represent the grouping:

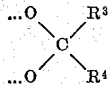

wherein R³ is selected from the group consisting of hydrogen and lower alkyl and R⁴ is selected from the group consisting of hydrogen and lower alkyl, monocyclic aryl, monocyclic aralkyl and monocyclic alkarlyl; R⁵ is selected from the group consisting of hydrogen and acyl containing less than 12 carbon atoms; X is selected from the group consisting of hydrogen, fluorine and chlorine, and Y is selected from the group consisting of hydrogen, β-hydroxyl and keto, with X being hydrogen when Y is hydrogen.

21. 5,10-methylene-19-nor-$\Delta^2$-pregnene - 17α,21 - diol-20-one.

22. A compound represented by the formula:

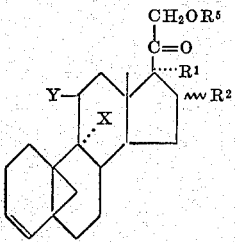

wherein R¹ is hydroxyl, R² is selected from the group consisting of hydrogen, α-methyl, β-methyl and α-hydroxyl; R¹ and R² taken together represent the grouping:

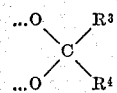

wherein R³ is selected from the group consisting of hydrogen and lower alkyl and R⁴ is selected from the group consisting of hydrogen and lower alkyl, monocyclic aryl, monocyclic aralkyl and monocyclic alkarlyl; R⁵ is selected from the group consisting of hydrogen and acyl containing less than 12 carbon atoms; X is selected from the group consisting of hydrogen, fluorine and chlorine, and Y is selected from the group consisting of hydrogen, β-hydroxyl and keto, with X being hydrogen when Y is hydrogen.

23. 5,10-methylene-19-nor-$\Delta^3$-pregnene - 17α,21 - diol-20-one.

24. A compound represented by the formula:

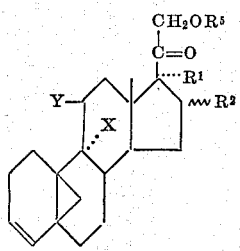

wherein R¹ is hydroxyl, R² is selected from the group consisting of hydrogen, α-methyl, β-methyl and α-hydroxyl; R¹ and R² taken together represent the grouping:

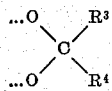

wherein R³ is selected from the group consisting of hydrogen and lower alkyl and R⁴ is selected from the group consisting of hydrogen and lower alkyl, monocyclic aryl, monocyclic aralkyl and monocyclic alkarlyl; R⁵ is selected from the group consisting of hydrogen and acyl containing less than 12 carbon atoms; X is selected from the group consisting of hydrogen, fluorine and chlorine, and Y is selected from the group consisting of hydrogen, β-hydroxyl and keto, with X being hydrogen when Y is hydrogen.

References Cited by the Examiner

Barton et al.: J.A.C.S. 83, pp. 4083–89 (1961).

LEWIS GOTTS, *Primary Examiner*.